United States Patent
Aronsson et al.

(10) Patent No.: US 7,761,976 B2
(45) Date of Patent: Jul. 27, 2010

(54) METHOD FOR MOUNTING MAGNET ELEMENTS ON A ROTOR FOR USE IN A PERMANENT MAGNET MOTOR

(75) Inventors: Bo Aronsson, Vissefjärda (SE); Tomas Bartholf, Nacka (SE); Jörgen Engström, Grödinge (SE); Tanja Heikkilä, Stockholm (SE)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 0 days.

(21) Appl. No.: 12/088,547

(22) PCT Filed: Sep. 21, 2006

(86) PCT No.: PCT/SE2006/001075

§ 371 (c)(1),
(2), (4) Date: Mar. 28, 2008

(87) PCT Pub. No.: WO2007/037738

PCT Pub. Date: Apr. 5, 2007

(65) Prior Publication Data

US 2008/0244895 A1 Oct. 9, 2008

(30) Foreign Application Priority Data

Sep. 28, 2005 (SE) .................................. 0502125
Sep. 7, 2006 (SE) .................................. 0601833

(51) Int. Cl.
*H02K 15/02* (2006.01)
(52) U.S. Cl. .............................. 29/598; 29/596; 310/43; 310/156.43

(58) Field of Classification Search ........... 29/596–598, 29/732, 738, 609; 310/42–46, 156.28, 156.43–156.45, 310/156.25

See application file for complete search history.

(56) References Cited

U.S. PATENT DOCUMENTS

| | | | | |
|---|---|---|---|---|
| 3,858,308 A | * | 1/1975 | Peterson | 29/598 |
| 4,015,154 A | * | 3/1977 | Tanaka et al. | 310/42 |
| 5,040,286 A | * | 8/1991 | Stark | 29/598 |
| 5,063,318 A | | 11/1991 | Anderson | |
| 5,237,737 A | | 8/1993 | Zigler et al. | |

(Continued)

FOREIGN PATENT DOCUMENTS

DE 3224904 A 1/1984

(Continued)

*Primary Examiner*—Minh Trinh
(74) *Attorney, Agent, or Firm*—Browdy and Neimark, PLLC (57) ABSTRACT

The present invention relates to a method for mounting magnet elements on the surface of a rotor for use in a permanent magnet motor. The method comprises the steps of : providing a first tube like element, wherein said first tube like element has an inner diameter that corresponds to an outer diameter of said rotor, providing a second tube like element, wherein said second tube like element has an inner diameter that is larger than an outer diameter of said first tube like element, inserting said first tube like element into said second tube like element, in order to create a hollow space between them, inserting a number of magnet elements into said hollow space, and inserting said rotor into said first tube like element, whereupon said magnet elements are in a tight fit arrangement between said first tube like element and said second tube like element.

13 Claims, 7 Drawing Sheets

U.S. PATENT DOCUMENTS

| | | | | |
|---|---|---|---|---|
| 5,311,092 A | * | 5/1994 | Fisher | 310/266 |
| 5,528,095 A | * | 6/1996 | Strobl | 310/156.12 |
| 5,563,463 A | | 10/1996 | Stark | |
| 6,104,115 A | * | 8/2000 | Offringa et al. | 310/156.28 |
| 7,159,297 B2 | * | 1/2007 | Inaishi et al. | 29/598 |

FOREIGN PATENT DOCUMENTS

| | | |
|---|---|---|
| DE | 29510521 | 6/1995 |
| EP | 0942511 A2 | 9/1999 |

* cited by examiner

METHOD FOR MOUNTING MAGNET ELEMENTS ON A ROTOR FOR USE IN A PERMANENT MAGNET MOTOR

TECHNICAL FIELD OF THE INVENTION

The present invention pertains generally to rotating electric machines comprising a stator and a rotor. The rotating electric machine can for instance be used as a generator, as a motor, as an inverted rotor machine or as a rotating synchronous compensator. More specifically the present invention relates to a permanent magnet machine where the magnets are mounted on the surface of the rotor (surface mounted magnets) or the like as well as the manufacturing thereof.

BACKGROUND OF THE INVENTION AND STATE OF THE ART

Conventional rotating machines used for instance as induction machines, synchronous machines or permanent magnet machines or the like comprise a rotor and a stator. The stator may be provided with a number of teeth each having an essentially similar shape both in its axial extension and in each radial cross section. The teeth are arranged on the inner periphery of the stator at equal distance from each other and are separated from each other by axially extending intermediate slots. In an inverted rotor machine the teeth are instead arranged on the outer periphery of the stator. The surface of each respective tooth facing the rotor in each radial cross section has the shape of a circular arc concentric to the envelope surface of the rotor. Furthermore, windings are arranged in the respective stator slots, and the air gap in a rotating electric machine may be constant both in its axial extension and in each radial cross section around the complete rotor. Permanent magnets are normally circumferentially disposed on the surface of the rotor and fixed to the surface of the rotor, for example, by means of a thin layer of adhesive.

Other known ways of mounting magnet elements on a rotor includes distinct preassembly of the magnet elements on a magnet holder, by means of an adhesive. Thereafter the magnet holder is attached to the rotor in a suitable way. Thus, the abovementioned methods use an adhesive as an essential component when mounting the magnet elements to the rotor, which implies that chemical compounds are needed in the production process of the rotor. Thus, production equipment suited for the handling of chemical compounds is needed, which implies a more expensive production. The adhesive is also a drawback upon recycling of the rotor, since special tools or chemical agents are needed in order to separate the different parts of the rotor from each other. It is also known to wrap a bandage of glass fibre/aramid fibre around the magnets in order to keep the magnets in place on the magnet holder, sometimes in combination with an adhesive, but this method is cumbersome and time consuming.

Thus, there is a need of an improved method for manufacturing rotors and, in particular to a method for mounting magnet elements on a rotor for use in permanent magnet motors.

BRIEF DESCRIPTION OF THE INVENTION

The present invention aims at obviating the aforementioned disadvantages of previously known methods for mounting magnet elements on a rotor, and at providing an improved method. Thus, a primary object of the present invention is to provide an improved method for mounting magnet elements on a rotor for use in permanent magnet motors. It is another object of the present invention to provide a method for mounting magnet elements on rotors for use in permanent magnet motors, which method reduces the production costs. It is still another object of the present invention to provide a method for manufacturing a rotor for use in a permanent magnet motor.

According to the invention at least the primary object is attained by means of the initially defined method having the features defined in the independent claim. Preferred embodiments of the present invention are further defined in the dependent claims.

According to a first aspect of the present invention, there is provided a method for mounting magnet elements on a rotor for use in a permanent magnet motor. The method comprises the steps of: providing a first tube like element, wherein said first tube like element has an inner diameter that corresponds to an outer diameter of said rotor, providing a second tube like element, wherein said second tube like element has an inner diameter that is larger than an outer diameter of said first tube like element, inserting said first tube like element into said second tube like element, in order to create a hollow space between them, inserting a number of magnet elements into said hollow space, and inserting said rotor into said first tube like element, whereupon said magnet elements are in a tight fit arrangement between said first tube like element and said second tube like element.

It shall be pointed out that in the context of the present invention the term "magnet element" refers to an element made of a material that either is a permanent magnet or can be magnetized on a permanent basis thus achieving a permanent magnet.

According to a second aspect of the present invention, there is provided a rotor mounted in accordance with the method according to the first aspect for use in a permanent magnet motor.

Thus, the invention is based on the idea of making the mounting procedure and the manufacturing of rotors for use in permanent magnet motors simple and module based. The invention provides several advantages in comparison to known methods. For example, the first tube like element is arranged with size and shape and an inner diameter that substantially corresponds to an outer diameter of the rotor. Furthermore, the ratio between the outer diameter of the first tube like element and the inner diameter of the second tube like element is such that the magnet elements can be introduced into the hollow space in principle by hand. Thus, the mounting process is significantly facilitated, thereby reducing the amount of time required for the mounting. This, in turn, reduces the overall manufacturing costs.

According to one embodiment of the present invention, the magnet elements are magnetized after they have been inserted into the hollow space between the first tube like element and the second tube like element. Moreover, this type of magnetization process is facilitated and rendered more flexible in comparison to known techniques due to the fact that the entire assembly can be located inside the magnetization device and thereby the coil of the magnetization device can be located adjacent to the outer surfaces of the second tube like element. This makes it possible to perform the magnetization in one step, i.e. all magnet elements may be magnetized substantially simultaneously. Alternatively, one pole can be magnetized at a time or one magnet element can be magnetized at a time. Hence according to this embodiment a great flexibility is offered by the present invention. Thereto, the insertion of the magnet elements is facilitated since there are no magnet forces that may interfere and act on other objects during the insertion.

Another advantage according to the present invention is that rotors of great variety of types, including rotors adapted for use in an asynchronous motor, can be used without any major modifications, which hence facilitates the production and also lowers the productions costs.

According to preferred embodiments, the first tube like element is designed such that the insertion of the rotor into the first tube like element is facilitated, for example by arranging said first tube like element with, for example, slits. The insertion may also be facilitated by turning the rotor slightly conical during the turning down procedure of the rotor.

The first tube like element, is adapted to bridge the rotor grooves in a magnetic sense of meaning, i.e. the distribution of the magnetic fields produced during operation of the motor including the rotor is improved in that the flux density is increased. Thereby, a given flux density can be achieved with smaller magnets. This is possible due to the fact that the inner magnet holder is made of a magnetic material.

Further objects and advantages of the present invention will be discussed below by means of exemplifying embodiments.

BRIEF DESCRIPTION OF THE DRAWINGS

A more complete understanding of the above mentioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

In the following, there will be disclosed preferred embodiments of the method for mounting magnet elements on rotors for use in permanent magnet motors according to the present invention.

Figure 1:
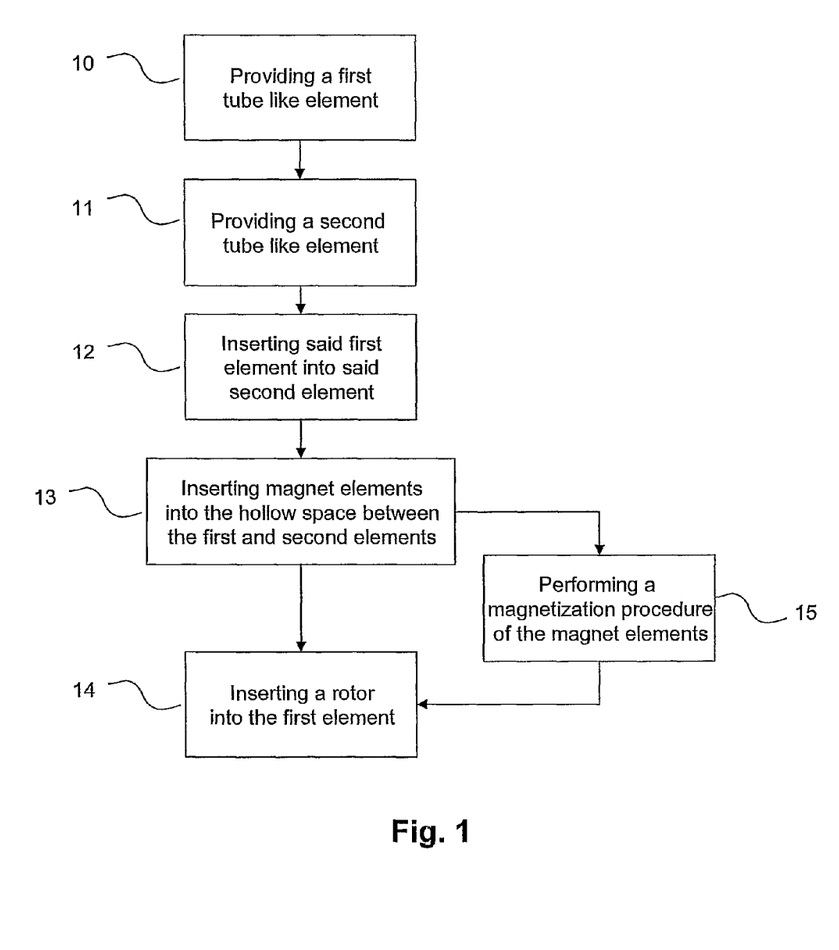
FIG. 1 is a flow diagram showing the general principles of the method according to the present invention.
Figure 2A:
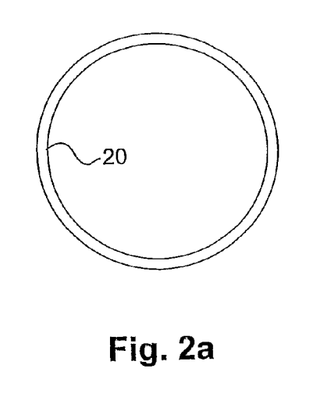
FIGS. 2a-2g show different stages of the manufacturing process of a rotor unit manufactured according to the present invention.

With reference first to FIG. 1, the general principles of the method for mounting magnet elements on a rotor for use in a permanent magnet motor according to the present invention will be discussed. First, at step 10, a first tube like element or an inner magnet holder is provided, as shown in FIG. 2a where the inner magnet holder indicated with the reference numeral 20 is shown in a radial cross section. This inner magnet holder 20 has an inner diameter that is substantially equal to an outer diameter of a rotor 28, which is about to be inserted into said inner magnet holder 20. Preferably, an axial length of the inner magnet holder 20 is substantially equal to the axial length of the rotor 28. Preferably, said inner magnet holder 20 is made of magnetic material such as sheet metal and, furthermore, the thickness should be large enough to provide a sufficient mechanical torsional rigidity of the inner magnet holder. Preferably, said thickness is about 0.5-1.7 mm, and more preferably about 0.7-1.0 mm. The inner magnet holder 20 may be provided with a slit, which wholly or partly extends from one end towards the other end of said inner magnet holder. The slit may be straight or helix shaped in order to facilitate the insertion of the rotor 28.

Figure 2B:
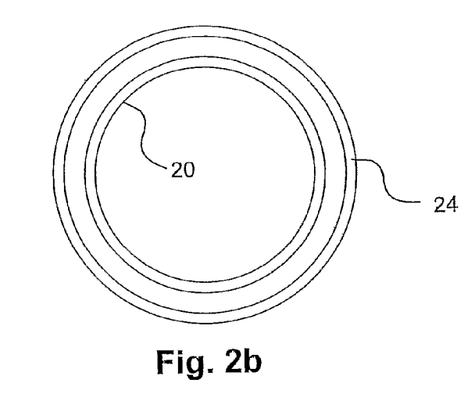
Figure 2C:
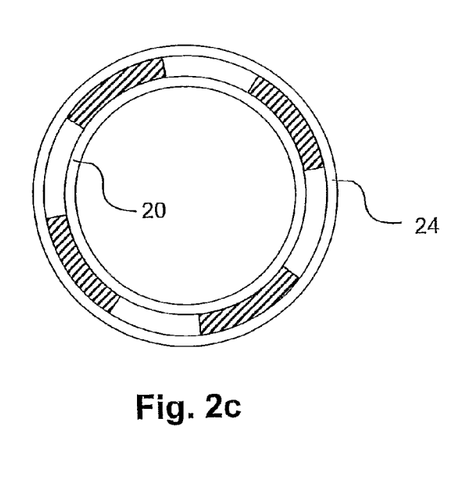

Thereafter, at step 11, a second tube like element or outer magnet holder 24 is provided and the inner magnet holder 20 is inserted into the outer magnet holder 24 at step 12, as shown in FIG. 2b. This outer magnet holder 24 serves, inter alia, a purpose of stabilizing the construction and securing magnet elements 22a-22d, which are about to be inserted between the inner magnet holder 20 and the outer magnet holder 24. The outer magnet holder 24 can be made of, for example, a non-metallic material such as a fibrous material or a metallic material (non-magnetic or magnetic). If a metallic material is used, the outer magnet holder 24 can be used for electrically shielding the magnet elements 22a-22d, in which case the outer magnet holder 24 also functions as a start winding. Preferably, the outer magnet holder 24 has a thickness of about 0.2-1.7 mm, and, more preferably about 0.5-1.0 mm.

Figure 2D:
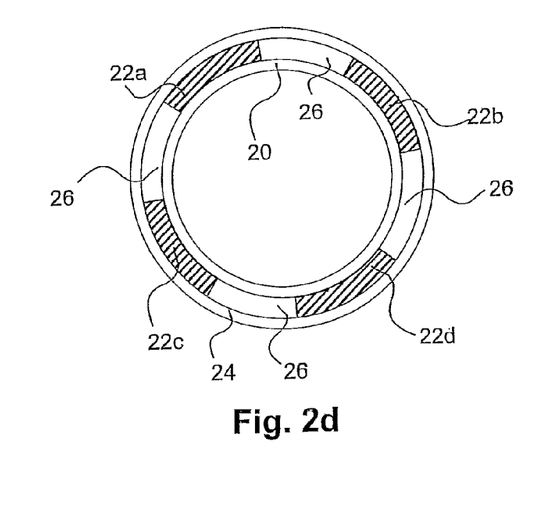

Then, at step 13, a plurality of magnet elements 22a-22d are inserted between the inner magnet holder 20 and the outer magnet holder 24. This may be performed by means of inserting elongated magnet element rods, which may have a length being substantially equal to the length of the inner and outer magnet holders 20 and 24, respectively, in the longitudinal hollow space between the inner magnet holder 20 and the outer magnet holder 24. The spaces 26, see FIG. 2d, between different magnet elements can be filled with a fixation means that fixates the magnet elements 22a-22d and also distributes and levels out different kinds of forces arising when the rotor 28 is inserted into the magnet holder unit, i.e. the inner magnet holder 20, the outer magnet holder 24 and the magnet elements 22a-22d. The fixation means may be of a non-magnetic material, e.g. the same material as the magnetisable magnet elements, plastics, etc.

The radial dimension of the hollow space, between the inner magnet holder and the outer magnet holder, is preferably slightly bigger than the thickness of the magnet elements, and thus the magnet elements 22a-22d may be inserted into the hollow space in principle by hand. A fixture may be used to fixate the magnet elements, awaiting the insertion of the rotor 28. Upon insertion of the rotor 28 into the magnet holder unit, the magnet elements will be in a tight fit arrangement between the inner magnet holder and the outer magnet holder, since the outer diameter of the rotor 28 is slightly bigger than the inner diameter of the inner magnet holder, taken when in unassembled state. Thus, the rotor 28 expands the inner magnet holder 20 upon insertion such that the magnet elements are in a tight fit arrangement between the inner magnet holder and the outer magnet holder.

The magnet elements may be provided with an adhesive such that they may be fixed at the outer surface of the inner magnet holder 20 and/or at the inner surface of the outer magnet holder 24, after being inserted into the longitudinal hollow space. Preferably, the magnet elements 22a-22d are fixed at any one of the inner and outer magnet holder 20, 24 such that the magnet elements are capable of moving slightly with respect to the inner and outer magnet holder 20, 24.

Figure 2E:
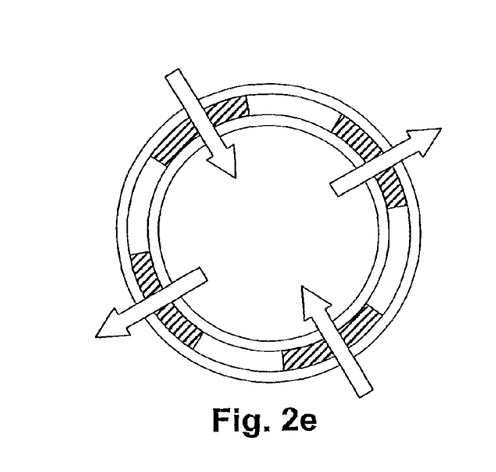
Figure 2F:
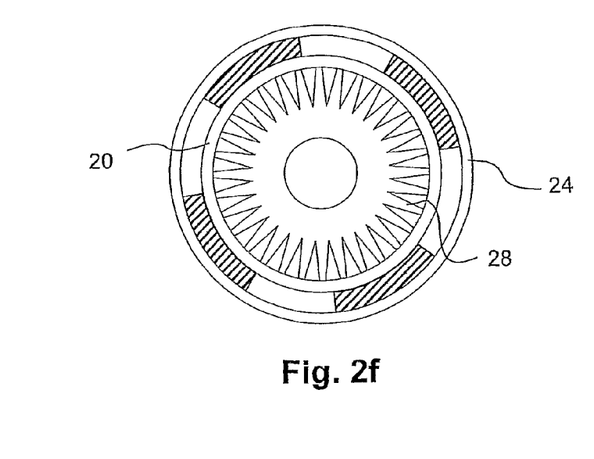

Finally, at step 14, a rotor 28 is inserted into the inner magnet holder 20, see FIG. 2f. Preferably, the rotor 28 is a rotor for use in an asynchronous motor. Therefore, the rotor 28 have to be turned down in order to reduce its outer diameter to a diameter corresponding to the inner diameter of the inner magnet holder 20 so that the rotor unit, i.e. the rotor 28, the inner magnet holder 20, the outer magnet holder 24 and the magnet elements 22a-22d, fit into the stator of the permanent magnet machine.

In an alternative embodiment of the present invention a step 15 is performed after the magnet elements 22a-22d are inserted into the hollow space and before the rotor 28 is inserted into the inner magnet holder 20. At step 15, a magnetization process is performed in order to magnetize the magnet elements 22a-22d, see FIG. 2e where the magnet fields generated to magnetize the magnet elements are indicated with arrows. Thus, the magnet elements are not magnetic during the insertion thereof into the hollow space between the inner magnet holder 20 and the outer magnet holder 24.

The magnetization process is facilitated due to the fact that the magnetization device located at the outside of the outer magnet holder 24 adjacent to the outer surfaces of the magnet elements 22a-22d or inside the inner magnet holder 20 adjacent to the inner surface of the inner magnet holder 20, and, thereby adjacent to the inner surfaces of the magnet elements 22a-22d. According to one embodiment, the magnetization process is performed in one step, i.e. all magnet elements are magnetized substantially simultaneously. In an alternative embodiment, one pole is magnetized at a time. According to yet another embodiment, one magnet is magnetized at a time.

Figure 3:
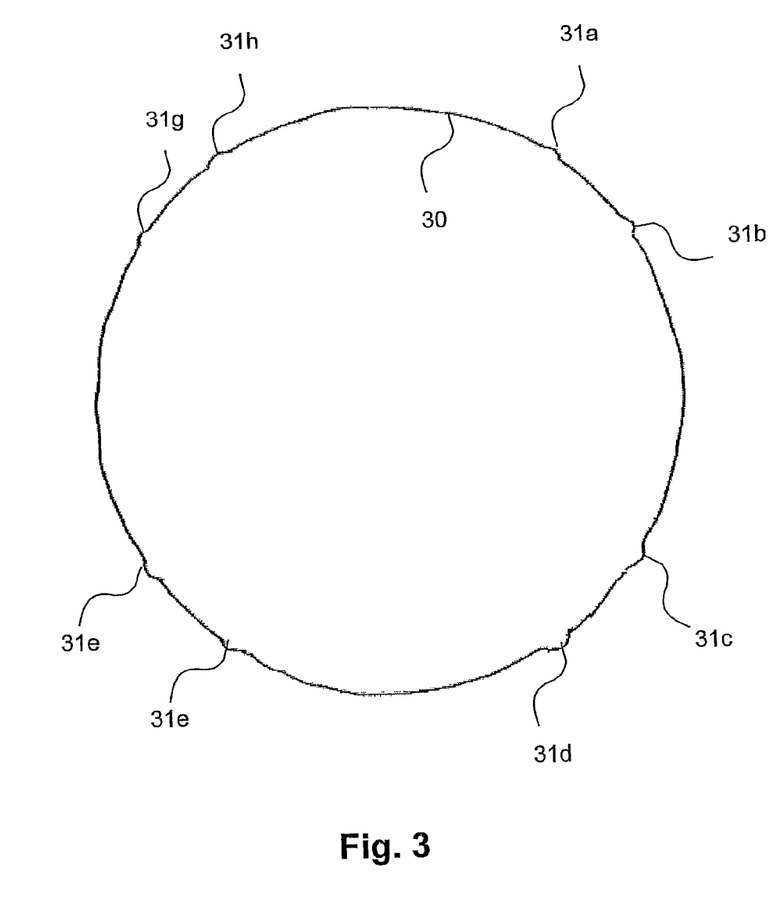
FIG. 3 shows an embodiment of the inner magnet holder.
Figure 4:
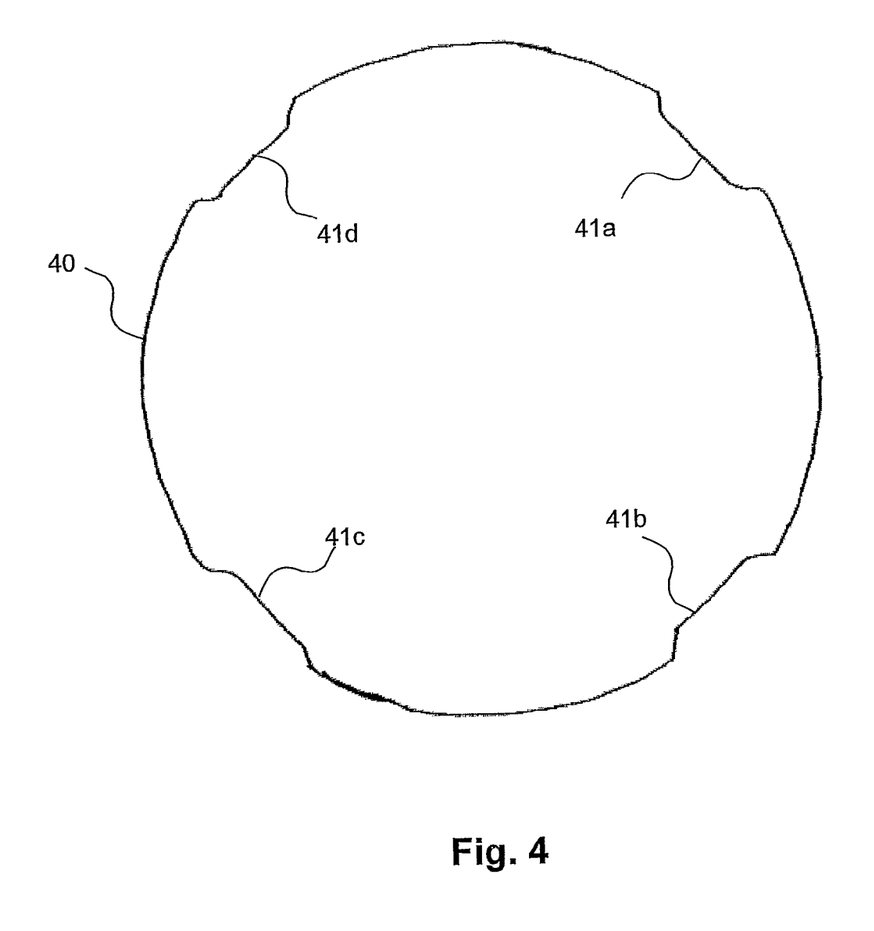
FIG. 4 shows an embodiment of the outer magnet holder.
Figure 5:
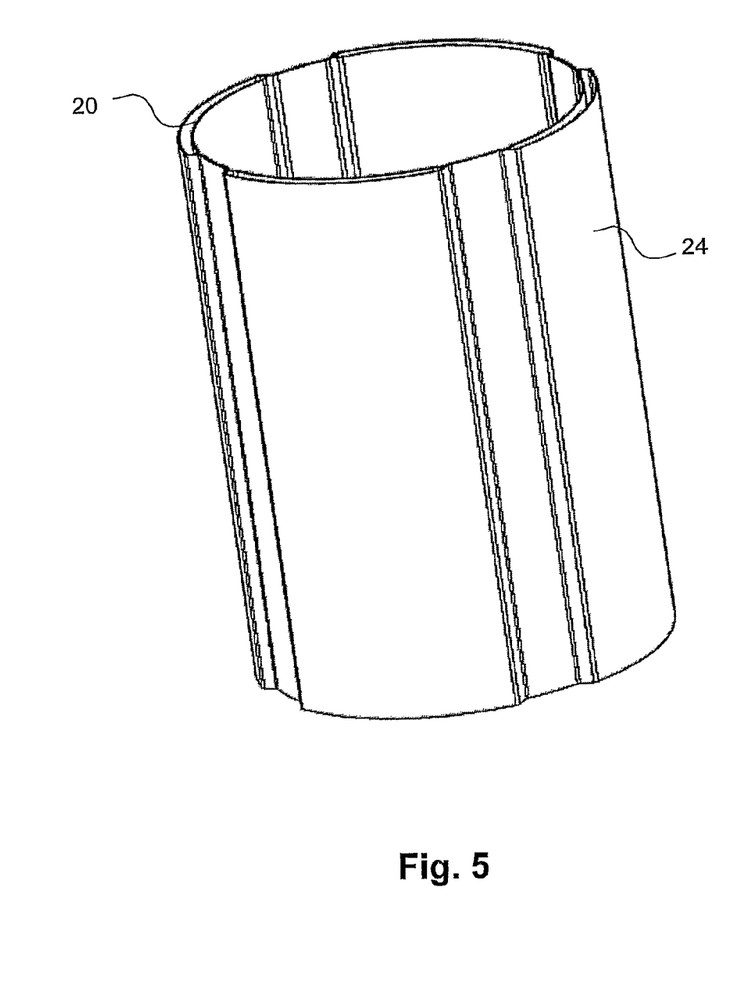
FIG. 5 shows the inner magnet holder according to FIG. 3 inserted into the outer magnet holder according to FIG. 4.

One embodiment of the inner magnet holder is shown in FIG. 3, the inner magnet holder 30 shown in a radial cross section being provided with longitudinal protrusions 31a-31h. A corresponding embodiment of the outer magnet holder is shown in FIG. 4, the outer magnet holder 40 shown in a radial cross section being provided with longitudinal protrusions 40a-40d at the inner surface, which protrusions correspond to grooves at the outer surface thereof. In an assembled condition, see FIG. 5, i.e. when the inner magnet holder 30 shown in FIG. 3 has been inserted into the outer magnet holder 40 shown in FIG. 4, the protrusions 40a-40d interact with the protrusions 31a-31h to fixate the inner magnet holder 30 in relation to the outer magnet holder 40. It shall be pointed out that the inner magnet holder 30 according to FIG. 3, may be inserted into an entirely cylindrical outer magnet holder 24, or an entirely cylindrical inner magnet holder 20 may be inserted into a outer magnet holder 40, according to FIG. 4. Moreover, said protrusions may have different shape or size, and they may be of different number, than in the shown embodiments. In a preferred embodiment, the outer magnet holder 24 is entirely cylindrical and the inner magnet holder 30 is as shown in FIG. 3. This combination gets the inner magnet holder 30 to expand when inserting the rotor 28 and gets the outer magnet holder 24 to withstand expansion, such that the magnet elements 22a-22d are in a distinct tight fit arrangement therebetween.

The protrusions 31a-31h of the inner magnet holder 30 and/or the protrusions 40a-40d of the outer magnet holder 40, facilitates the insertion of the magnet elements as they may, for example, serve as guide means and support means during the mounting procedure. For example, a first row of magnet elements can be arranged along the first protrusion 30a, and, then a second row of magnet elements can be arranged in alignment along the first row of magnet elements and so on.

Figure 2G:
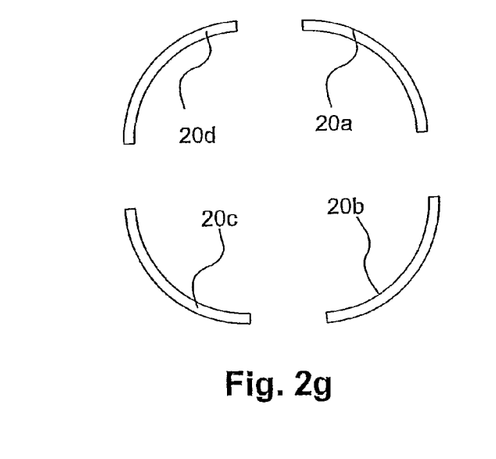

Reference is now made to FIG. 2g, which shows another embodiment of the inner magnet holder. A first set of arc-shaped elements is provided, preferably a set of four arc-shaped elements 20a-20d is provided. As understood by the man skilled in the art, the four arc-shaped elements will, when put together, form a tubular element, such as the inner magnet holder shown in FIG. 2a. However, as the skilled man realizes, there are a number of other conceivable designs. For example, two arc-shaped, i.e. semi-circular, elements can be used provided that they, when put together, form a tubular element such as the inner magnet holder shown in FIG. 2a. The axial lengths of the arc-shaped elements are substantially equal to the axial length of the rotor 28. Preferably the four arc-shaped elements are joined together by means of spot welding, for example, by means of electrode welding. Furthermore, the arc-shaped elements 20a-20d may be made of a magnetic material such as sheet metal and the thickness of the elements is about 0.5-1.3 mm, and preferably about 0.7-1.0 mm. The thickness of the elements should however be large enough to provide a sufficient mechanical torsional rigidity.

Figure 6:
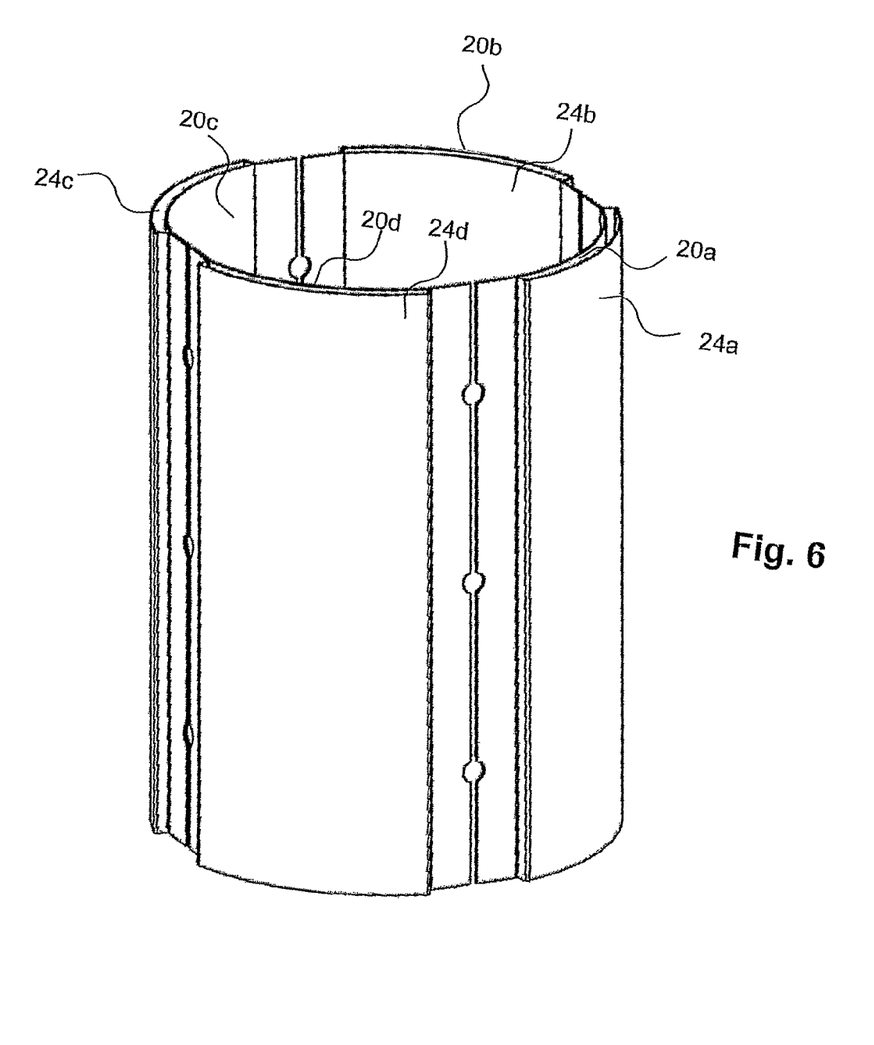
FIG. 6 shows an embodiment of the present invention including arc-shaped elements.

Further, a second set of arc-shaped elements may be provided, one for each arc-shaped element of the first set, wherein each element of the second set has a shape substantially corresponding to the corresponding element of the first set. An element from the second set of arc-shaped elements is joined or put together with an element of the first set of arc-shaped elements, e.g. by means of spot welding. In FIG. 6, a perspective view of this alternative embodiment of the present invention is shown. As can be seen, the inner tube-like element comprises four arc-like elements 20a-20d joined together and the outer tube-like element comprises four arc-like elements 24a-24d, each attached to the respective element from the first set of arc-shaped elements. Alternatively, the elements of the second set of arc-shaped elements are put together to form the outer magnet holder according to FIG. 2b, whereupon the inner magnet holder is inserted into the outer magnet holder.

In the case of magnetization of the magnet elements after the insertion thereof into the hollow space, between the elements of the first set of arc-shaped elements and the elements of the second set of arc-shaped elements, each pair of arc-shaped elements provided with magnet elements is exposed for the magnetization process. This process is facilitated due to the fact that one pair of arc-shaped element can be magnetized in turn. Moreover, a smaller magnetization device can be used since the magnetization process can be performed on one element at a time. This also entails that the costs for the process will be lower due to the fact that smaller equipment can be used. As mentioned above, the magnetization device comprises, in principle, a coil adapted to generate a strong magnetic field. The arc-shaped elements are placed inside the coil and, thus, the coil will be located adjacent to the outer surfaces of the magnet elements. In this embodiment, each pair of arc-shaped element constitutes one pole.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. This application is intended to cover any adaptations or variations of the preferred embodiments discussed herein. Consequently, the present invention is defined by the wording of the appended claims and equivalents thereof.

The invention claimed is:

1. A method for mounting magnet elements (22a, 22b, 22c, 22d) on a rotor (28) for use in a permanent magnet motor, comprising the steps:

providing a first tubular element (20), wherein said first tubular element (20) has an inner diameter that corresponds to an outer diameter of said rotor (28), and has a thickness of 0.5-1.7 millimeters in the radial direction, providing a second tubular element (24), wherein said second tubular element (24) has an inner diameter that is larger than an outer diameter of said first tubular element (20), inserting said first tubular element (20) into said second tubular element (24), in order to create a hollow space between them, thereafter inserting a number of magnet elements (22a, 22b, 22c, 22d) into said hollow space, and thereafter inserting said rotor (28) into said first tubular element (20), the first tubular element (20) being radially expanded, whereupon said magnet elements are in a tight fit arrangement between said first tubular element (20) and said second tubular element (24).

2. The method according to claim 1, after the insertion of the magnet elements into the hollow space and before the insertion of the rotor into the first tubular element, further comprising the step:

performing a magnetization procedure in order to magnetize said inserted magnet elements (22a, 22b, 22c, 22d), in order to obtain permanent magnets.

3. The method according to claim 1, wherein the magnet elements (22a, 22b, 22c, 22d) are permanent magnets before insertion into the hollow space.

4. The method according to claim 1, wherein the first tubular element (80') is constituted by a set of interconnected arc-shaped elements (80a, 80b, 80c, 80d).

5. The method according to claim 1, wherein said magnet elements (22a, 22b, 22c, 22d) are mounted in a number of longitudinal rows, each row being substantially parallel with a longitudinal axis of said rotor (28) and each row comprising at least one magnet element (22a, 22b, 22c, 22d).

6. The method according to claim 1, wherein the first tube element (20) is made of a magnetic material.

7. The method according to claim 1, wherein said second tubular element (24) is made of a non-magnetic material.

8. The method according to claim 1, further comprising the step:

applying a fixation material in the hollow space between the individual magnet elements (22a, 22b, 22c, 22d).

9. The method according to claim 8, wherein said fixation material is a non-magnetic material.

10. The method according to claim 1, further comprising the step:

providing a rotor (28) to a predetermined diameter, said predetermined diameter being substantially equal to an inner diameter of said first tubular element (20).

11. The method according to claim 1, further comprising the step:

introducing said rotor (28) provided with said first tubular element (20) and said second tubular element (24) into a stator.

12. The method according to claim 1, wherein said second tubular element (24) is made of a magnetic material.

13. The method according to claim 1, wherein said step of inserting said rotor (28) into said first tubular element (20) radially expands the first tubular element so that the magnet elements are in a tight fit arrangement between said first tubular element (20) and said second tubular element (24).

* * * * *